United States Patent [19]

Ritsko et al.

[11] 4,184,868

[45] Jan. 22, 1980

[54] METHOD FOR PRODUCING EXTRA FINE COBALT METAL POWDER

[75] Inventors: Joseph E. Ritsko; Howard L. Acla; Clarence D. Vanderpool, all of Towanda; William Scheithauer, Jr., Sayre; Geoffrey L. Harris, Monroeton, all of Pa.

[73] Assignee: GTE Sylvania Incorporated, Stamford, Conn.

[21] Appl. No.: 10,769

[22] Filed: Feb. 9, 1979

Related U.S. Application Data

[63] Continuation of Ser. No. 911,595, May 31, 1978, abandoned.

[51] Int. Cl.$^2$ .............................................. C22B 23/04
[52] U.S. Cl. ................... 75/0.5AA; 75/108; 75/109; 75/119; 423/143
[58] Field of Search ............... 75/0.5 AA, 108, 109, 75/119; 423/143

[56] References Cited

U.S. PATENT DOCUMENTS

| 3,751,558 | 8/1973 | Crnojevich et al. ............ 423/143 X |
| 3,903,245 | 9/1975 | Wiewiorowski et al. ............ 423/143 |
| 3,928,530 | 12/1975 | Bakker et al. ............ 75/119 X |
| 4,093,450 | 6/1978 | Doyle et al. ............ 75/0.5 AA |

FOREIGN PATENT DOCUMENTS

| 605985 | 9/1960 | Canada ............ 423/143 |
| 1583864 | 9/1972 | Fed. Rep. of Germany . |
| 2319703 | 10/1973 | Fed. Rep. of Germany . |

OTHER PUBLICATIONS

J.A.C.S., vol. 60, p. 3053, (1938).
J.A.C.S., vol. 33, p. 1873, (1911).

*Primary Examiner*—G. Ozaki
*Attorney, Agent, or Firm*—John C. Fox

[57] ABSTRACT

Extra fine cobalt metal powder (up to about 0.8 microns) having less than 100 parts per million cation impurities is produced by a process in which cobalt pentammine chloride is digested in a dilute ammonium hydroxide solution to form a black precipitate, which is separated and heated in a hydrogen atmosphere to reduce the precipitate directly to cobalt metal powder. The cobalt pentammine chloride may be obtained by digesting a cobalt source in hydrochloric acid, adding ammonium hydroxide, oxidizing the cobaltous ion to cobaltic ion, and reducing the pH with hydrochloric acid to less than 1.0 in order to precipitate cobalt pentammine chloride. The final cobalt metal powder is useful, for example, as a starting material in the manufacture of cemented carbides.

8 Claims, No Drawings ic acid solution followed by the addition of ammonium hydroxide to form cobaltous pentammine chloride, oxidation of the cobaltous pentammine chloride to cobaltic pentammine chloride, and the addition of hydrochloric acid to reduce the pH to below 1.0 and precipitate cobalt pentammine chloride.

The extra fine particle size cobalt metal powder typically has a cation impurity of less than 100 parts per million, and is useful for example as a starting material in the manufacture of cemented carbides.

METHOD FOR PRODUCING EXTRA FINE COBALT METAL POWDER

This is a continuation of application Ser. No. 911,595 filed May 31, 1978, now abandoned.

BACKGROUND OF THE INVENTION

1. Field of the Invention

This invention relates to extra fine particle size cobalt metal powder and to a method for obtaining such powder from an impure cobalt source, and more particularly relates to obtaining such powder by reducing a black precipitate obtained from the digestion of a cobalt pentammine chloride solution.

2. Prior Art

It is known to separate cobalt from nickel by a process which includes forming pentammine sulfate complexes of the two ions in solution. German Pat. No. 2,319,703. However, it has been found that soluble cobalt ammine sulfates can only be reduced while still in solution, under pressure, and with the aid of catalysts. Furthermore, the resulting cobalt powder is not fine particle size. Finally minor impurities, below about 2 weight percent, cannot be removed by recrystallization of the cobalt ammine sulfates. Thus, more complex methods of removing such minor impurities, must be employed.

U.S. Pat. No. 3,928,530, issued Dec. 23, 1975 to Bakker et al, and assigned to International Nickel Co., teaches a process for the separation of nickel and cobalt by forming pentammine chloride complexes in solution containing a high concentration of ammonium chloride, and precipitating cobalt pentammine chloride at a basic pH. Such a system, however, is not suitable for the separation of cobalt from cationic impurities such as iron, manganese, copper, etc. since such impurities would also precipitate out at the basic pH.

In German Pat. No. 1,583,864, cobalt is recovered from scrap by digestion of the scrap in HCl and MgCl$_2$ solution, followed by removal of Fe and Cr impurities by precipitation at a moderately acid pH (2–4), followed by extracting a cobalt chloride complex with a long chain tertiary ammine in an aromatic solvent. Cobalt chloride is then stripped from the extractant and may be converted to cobalt metal by converting to cobalt oxide or cobalt hydroxide and then reducing to cobalt, e.g., by hydrogen reduction.

While the above process enables removal of undesired cationic impurities such as Fe and Cr, it nevertheless requires the use of organic extractants and solvents, and necessitates employing a stripping step to separate the extracted cobalt from the organic phase.

SUMMARY OF THE INVENTION

In accordance with one aspect of the invention, a process is provided for the formation of extra fine particle size (up to about 0.8 microns average particle size as calculated from B.E.T. surface area) cobalt metal powder directly by reduction of the black precipitate obtained by the digestion of pure (less than 1.0 weight percent of cationic impurities and less than 1000 parts per million of iron) cobalt pentammine chloride in dilute ammonium hydroxide solution.

In accordance with a preferred embodiment, the pure cobalt pentammine chloride is obtained by at least one recrystallization of crude cobalt pentammine chloride produced by the digestion of a cobalt source in hydro-

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

In its broadest aspect, the invention is a method for producing extra fine particle size (0.6 to 0.8 microns average particle size as calculated from B.E.T. surface area) cobalt metal powder from solid cobalt pentammine chloride, the cobalt pentammine chloride preferably having a cation impurity content of less than 1.0 weight percent and less than 1000 parts per million of Fe. Cation impurities are defined herein as those which may be detected by the analytical technique of spectrographic qualitative and quantitative analyses and include for example, iron, manganese, copper, aluminum, chromium, magnesium, calcium, etc. Such impurities are derived from preferred sources of cobalt for the process for example, sludges and leach solutions from cemented carbide or tungsten recovery operation, rondels and impure powders. Such pure cobalt pentammine chloride, that is, having a cation impurity content of less than 1.0 weight percent and less than 1000 parts per million Fe, in accordance with a preferred embodiment is obtained by at least one recrystallization of crude cobalt pentammine chloride, that is, containing up to 2 weight percent total of cation impurities. Where such crude cobalt pentammine chloride contains about 1 to 2 weight percent of cation impurities, one recrystallization step is generally required to reduce the impurity level to below 1.0 weight percent and 1000 parts per million Fe. Such recrystallization is achieved by adding sufficient cobalt pentammine chloride to an aqueous solution containing about 1 to 6% ammonia to obtain about 100 to 500 grams per liter of cobalt pentammine chloride. It will be preferred to heat the solution moderately, for example, to about 80° to 90° C., in order to facilitate substantially complete dissolution of the cobalt pentammine chloride. The solution may then be reduced to a pH of less than about 1.0 by the addition of HCl in order to precipitate purified cobalt pentammine chloride.

In accordance with a preferred embodiment, the crude cobalt pentammine chloride is obtained by a process including the steps of (1) digestion of a cobalt source in hydrochloric acid solution to obtain a solution of about 60 to 150 grams per liter of cobalt in 1 to 6 molar hydrochloric acid solution having a pH of about 0.1 to 1.5; (2) addition of ammonium hydroxide to result in a concentration of about 100 to 150 grams per liter of ammonium chloride and a pH of about 9.2 to 10; (3) oxidation of the cobaltous ion to cobaltic to form soluble cobaltic pentammine chloride, such as by aeration or contact with an oxidizing agent such as hydrogen peroxide or a combination of these, typically for a time of about 1 to 10 hours, and preferably about 2 to 8 hours; (4) heating the solution to a moderate temperature, for example about 80° to 90° C., in order to dissolve substantially all of the cobalt pentammine chloride; and (5) addition of sufficient hydrochloric acid to reduce the pH to less than 1.0 to precipitate crude cobalt pentammine chloride.

After the initial digestion of the cobalt source and prior to the addition of ammonium hydroxide to the solution, it may be necessary to remove insoluble sludge, typically containing tantalum, titanium and tungsten from cobalt sources including significant amounts of scrap or sludge from cemented carbide recovery operations. Separation of precipitates or sludges from solutions in any of the above steps may be accomplished by filtering followed by washing the filtrate. Preferably, heated slurries are cooled to a temperature below 50° C. prior to filtering.

The pure cobalt pentammine chloride obtained by one or more recrystallizations of the crude cobalt pentammine chloride, is converted to extra fine particle size cobalt metal powder by the following process: (1) forming a solution of about 100 to 500 grams per liter of the cobalt pentammine chloride in a 1 to 6% ammonia solution: (2) removing insoluble impurities from said cobalt pentammine chloride solution to result in a cation impurity content of less than 100 parts per million; (3) digesting the cobalt pentammine chloride solution for about 2 to 10 hours at a temperature of about 80° to 100° C. in order to form a black precipitate; (4) separating the black precipitate from the solution; and (5) heating the black precipitate in a reducing atmosphere for a time and temperature sufficient to reduce the precipitate to extra fine particle size cobalt metal powder having an average particle size of up to about 0.8 micron and a cationic impurity of less than 100 parts per million.

Such reduction is typically carried out in a hydrogen atmosphere for a time of from about 1 to 6 hours at a temperature within the range of about 350° C. to 600° C.

Examples will now be presented to aid the practitioner in appreciating the scope of the invention. (Show purity levels of crude, pure, hydroxide, cobalt particle size of cobalt, and yield of cobalt.)

EXAMPLE

Cobalt Chloride Solution to Crude Cobalt Pentammine Chloride 100 gallons of a cobalt chloride solution obtained by the digestion of scrap tungsten carbide in HCl is diluted with deionized water to a specific gravity of 1.252 and a pH of 0 at 22 resulting in a concentration of about 1 pound of cobalt chloride per gallon of water or about 115 grams per liter of cobalt chloride. Ammonium hydroxide is then added to lower the specific gravity to about 1.038 and to raise the pH to about 9.3 at 50° C., resulting in about 140 gallons of solution. The solution is then aerated at an air flow rate of about 16 cubic feet per minute for 3 hours after which 3 gallons of hydrogen peroxide are added and aeration continued for an additional 3 hours. Three additional gallons of hydrogen peroxide are then added followed by one additional hour of aeration. The oxidized solution is then heated to 90° C. and held for 15 minutes at this temperature after which 56 gallons of hydrochloric acid are added to lower the pH to 0.4 at 35° C. The solution is then digested at 90±2° C. for one hour. Agitation is continued throughout digestion. The digested solution is then slowly cooled to below 70° C., after which it is rapidly cooled with the aid of cooling water to 35° C. at which temperature the cooling water is removed, agitation is stopped and the precipitate is allowed to settle. A portion of the mother liquor is then decanted. The remaining mother liquor is then filtered to remove the precipitate and the filtered mother liquor is recombined with the decanted mother liquor. 542 pounds of precipitate are obtained in the form of crude cobalt pentammine chloride. 150 pounds of this crude cobalt pentammine chloride is then charged to 195 gallons of deionized water at about 60° C. and with agitation 18 gallons of ammonium hydroxide are added to achieve a pH of about 10 at 30° C. Continuing agitation, the slurry is then heated to about 65° C. until the crude pentammine chloride has dissolved, resulting in a 225 gallon solution having a pH of 9.1 and a specific gravity of 1.008 at 60° C. The solution is then filtered and 55 gallons of 30 percent hydrochloric acid are added to achieve a 265 gallon solution having a pH of about 0.3 at 82° C. The solution is digested for two hours with agitation, then slowly cooled to below 70° C. and fast cooled with cooling water to about 28° C. The precipitate is then allowed to settle and a portion of the mother liquor is decanted. The remaining mother liquor is then filtered to remove about 113 pounds of pure crystalline cobalt pentammine chloride.

Pure Cobalt Pentammine Chloride to Cobalt Precipitate 135 pounds of pure cobalt pentammine chloride are added with agitation to 185 gallons of deionized water at about 60° C. With agitation, 28 gallons of ammonium hydroxide are added to achieve a pH of 10.0 at 30° C. and a total volume of 220 gallons. The solution is then agitated and heated to a temperature of 60° C. to dissolve the pure cobalt pentammine chloride. The resulting solution has a pH of 9.3 and a specific gravity of 1.008 at 60° C. The solution is then filtered at about 40° C. and then heated to about 90° C. and digested at this temperature for 6 hours. The volume is maintained between 180 and 190 gallons during digestion by the addition of deionized water. At the end of digestion the pH is 6.4 at 80° C. With continuing agitation, the solution is slowly cooled to 70° C., and then fast cooled with cooling water to 40° C. The cobalt precipitate is allowed to settle and a portion of the mother liquor is decanted. The slurry remaining in the tank is washed to remove chloride by adding 140 gallons of hot deionized water and 1½ gallons of ammonium hydroxide and agitating for about 5 minutes after the slurry has been heated to about 80° C. The cobalt precipitate is again allowed to settle and is then removed by filtration. The cobalt precipitate is then reslurried in 70 gallons of hot deionized water, again allowed to settle and the mother liquor decanted. Filtering is again carried out.

Cobalt Precipitate to Cobalt Metal Powder

The wet cobalt precipitate filtrate is reduced to cobalt metal powder by loading 200 gram batches in refractory boats and stoking the boats into a hydrogen reduction furnace at 450° C. at a stoking rate of 10 minutes per boat, resulting in a total reduction time of about 1½ hours per boat.

While there has been shown and described what are at present considered the preferred embodiments of the invention, it will be obvious to those skilled in the art that various changes and modifications may be made therein without departing from the scope of the invention as defined by the appended claims.

TABLE I

Impurity Analysis of Crude Cobalt Pentammine Chloride Sample Lots, Parts Per Million Basis

| Lot No. | Ca | Cu | Mg | Mn | Ni | Si | Cr | Fe |
|---|---|---|---|---|---|---|---|---|
| 1 | 4.1 | 21 | 3.6 | 9.9 | 12 | 62 | 176 | 303 |
| 2 | 19 | 41 | 8.9 | 27 | 89 | 88 | 105 | >1000 |
| 3 | 83 | 153 | 45 | 125 | 403 | 195 | 259 | >1000 |
| 4 | 89 | 141 | 39 | 112 | 381 | 308 | 269 | >1000 |

TABLE II

Impurity Analysis of Pure Cobalt Pentammine Chloride Lots Parts Per Million Basis

| Lot No. | Ca | Cu | Mg | Mn | Ni | Si | Cr | Fe |
|---|---|---|---|---|---|---|---|---|
| 5 | <4.0 | 13 | 3.2 | 5.8 | 28 | 34 | 93 | 16 |
| 6 | <4.0 | 7.2 | 5.0 | 4.7 | <10 | 48 | 76 | 20 |
| 7 | <4.0 | 10 | 2.6 | 3.9 | <10 | 104 | 141 | 92 |
| 8 | 8.4 | 5.7 | 30 | 4.0 | <10 | 120 | 40 | 141 |
| 9 | <4 | 7.2 | <2.0 | 3.8 | <10 | 25 | 128 | 13 |
| 10 | <4 | 7.2 | <2.0 | 4.6 | <10 | 39 | 69 | 25 |
| 11 | <4 | 29 | 9.3 | 5.2 | <10 | 136 | 76 | 66 |
| 12 | 29 | 8.2 | 37 | 5.2 | <10 | 99 | 6.4 | <10 |
| 13 | 41 | 30 | 26 | 10 | 27 | 46 | 8.5 | 99 |

TABLE III

Impurity Analysis of Cobalt Precipitate Lots, Parts Per Million Basis

| Lot No. | Ca | Cu | Mg | Mn | Ni | Si | Cr | Fe |
|---|---|---|---|---|---|---|---|---|
| 14 | 19 | 4.3 | 21 | <3.0 | <10 | 39 | <6.0 | <10 |
| 15 | 14 | 6.9 | 21 | 4.0 | <10 | 90 | <6.0 | <10 |
| 16 | <4.0 | 4.8 | 4.4 | 3.0 | <10 | 44 | <6.0 | <10 |
| 17 | 23 | 7.8 | 23 | 3.9 | <10 | 82 | <6.0 | <10 |
| 18 | 17 | 4.7 | 23 | 3.5 | <10 | 58 | <6.0 | <10 |
| 19 | 13 | 4.2 | 18 | 3.9 | <10 | 40 | 7.0 | <10 |

What is claimed is:

1. A method for producing extra fine particle size cobalt metal powder, the method comprising:
    (a) forming a solution of about 100 to 500 grams per liter of cobalt pentammine chloride having less than about 0.1 to 1 weight percent cationic impurities and less than about 1,000 parts per million of iron, in a 1 to 6 weight percent of ammonia solution;
    (b) digesting the cobalt pentammine chloride solution for about 2 to 10 hours at a temperature of from about 80° to 100° C. in order to form a black precipitate;
    (c) separating the black precipitate from the solution; and
    (d) heating the black precipitate in a reducing atmosphere for a time and temperature sufficient to reduce the precipitate to extra fine particle size cobalt metal powder.

2. The method of claim 1 wherein the cobalt pentammine chloride is formed by at least one recrystallization of crude cobalt pentammine chloride containing from 1 to 2 weight percent of cationic impurities from an aqueous solution containing about 10 to 60 grams per liter of ammonia.

3. The method of claim 2 wherein the crude cobalt pentammine chloride is formed by a process comprising:
    (a) digesting a cobalt source in a 1 to 6 molar hydrochloric acid solution to result in about 60 to 150 grams per liter cobalt and a pH of about 0.1 to 1.5;
    (b) adding ammonium hydroxide to result in a concentration of about 100 to 150 grams per liter ammonium chloride and a pH of about 9.2 to 10;
    (c) oxidizing the cobaltous ion to cobaltic in order to form soluble cobaltic pentammine chloride;
    (d) heating the solution to a temperature of about 80° to 90° C. to dissolve substantially all of the cobalt pentammine chloride;
    (e) adding hydrochloric acid to reduce the pH to less than 1.0 and precipitate crude cobalt pentammine chloride.

4. The method of claim 3 wherein said oxidation is carried out by aeration of the solution for a period of about 2 to 8 hours.

5. The method of claim 1 wherein the reduction of the precipitate to cobalt metal powder is carried out by heating the precipitate in a hydrogen atmosphere for about 1 to 6 hours at a temperature of about 350° C. to 600° C.

6. The method of claim 1 wherein after forming the cobalt pentammine chloride solution and before digesting the solution, insoluble impurities are removed from the solution to result in a cation impurity content of less than 100 parts per million.

7. The method of claim 1 wherein the extra fine particle size cobalt metal powder has an average particle size up to about 0.8 microns.

8. The method of claim 1 wherein the extra fine particle size cobalt metal powder has an average particle size of 0.6 to 0.8 microns.

* * * * *